United States Patent [19]

Chen

[11] Patent Number: 5,435,604

[45] Date of Patent: Jul. 25, 1995

[54] TUBE CONNECTING DEVICE

[76] Inventor: Waterson Chen, No. 50-10, Shu-Wang Rd., Ta-Li Hsiang, Taichung Hsien, Taiwan

[21] Appl. No.: 278,677

[22] Filed: Jul. 21, 1994

[51] Int. Cl.⁶ .............................................. F16L 55/00
[52] U.S. Cl. ...................... 285/84; 285/312; 285/85
[58] Field of Search ...................... 281/81, 84, 85, 87, 281/311, 312

[56] References Cited

U.S. PATENT DOCUMENTS

| | | | |
|---|---|---|---|
| 3,439,942 | 4/1967 | Moore et al. | 285/312 |
| 4,222,593 | 9/1980 | Lauffenburger | 285/85 |
| 4,295,670 | 10/1981 | Goodall et al. | 285/312 |
| 4,647,075 | 3/1987 | Vargo | 285/312 |
| 4,691,942 | 9/1987 | Ford | 285/84 |
| 4,871,195 | 10/1989 | Parrish | 285/312 |
| 5,295,717 | 3/1994 | Chen | 285/84 |
| 5,338,069 | 8/1994 | McCarthy | 285/85 |

Primary Examiner—Eric K. Nicholson
Attorney, Agent, or Firm—Kenyon & Kenyon

[57] ABSTRACT

A tube connecting device includes a first tubular connector and a second tubular connector which extends into the first connector and which is formed with an annular peripheral groove that is registered with a pair of radial openings in the first connector. A press arm has one end mounted pivotally to the first connector adjacent to each radial opening and formed with a cam face. Each press arm is formed with a positioning seat in which a positioning rod is provided slidably and is pivotable to a locking position so that the cam face thereof extends into the groove via the respective radial opening. A retaining seat is disposed below each radial opening and is formed with a vertical through-hole into which a first end portion of the positioning rod is biased to extend when the press arm is in the locking position. A locating projection is disposed immediately below each retaining seat. The positioning seat abuts against the respective locating projection when the respective press arm is in the locking position. A pair of guard plates are located on two sides of each retaining seat and each locating projection. Each pair of guard plates cover two sides of a corresponding press arm when the corresponding press arm is in the locking position.

3 Claims, 8 Drawing Sheets

TUBE CONNECTING DEVICE

BACKGROUND OF THE INVENTION

1. Field Of The Invention

This invention relates to a tube connecting device, more particularly to an improved tube connecting device which can be easily installed and which provides firm and stable connection between two tubes.

2. Description Of The Related Art

A conventional tube connecting device has been disclosed in U.S. Pat. No. 5,295,717 by the applicant of the present invention. The conventional tube connecting device includes first and second tubular connector members, a pair of press arms, a pair of retaining seats and a pair of retaining units. The first connector member has a receiving end portion formed with a pair of opposite radial openings and an extension end portion to be connected to a corresponding tube. The second connector member has an insert end portion which extends into the receiving end portion and an engaging end portion to be connected to a corresponding tube. The insert end portion has an outer surface which is formed with an annular peripheral groove that is registered with the radial openings. Each of the press arms has one end mounted pivotally to the first connector member adjacent to a respective one of the radial openings and formed with a cam face, and is pivotable to a locking position in which the cam face thereof extends into the peripheral groove via the respective radial opening so as to press against the second connector member at the annular groove in order to secure the second connector member to the first connector member. Each of the retaining seats projects outwardly from the first connector member and is disposed below a respective one of the radial openings. Each of the retaining seats has an inwardly and downwardly inclined side surface and a bottom formed with a vertical blind bore. Each of the press arms has an inner side which is formed with a longitudinal positioning seat. The positioning seat is formed with an axial positioning bore which is aligned with the blind bore in a respective one of the retaining seats when the press arm is in the locking position. Each of the retaining units includes a positioning rod which is provided slidably in the positioning bore of a respective positioning seat and which has first and second end portions that extend out of the positioning bore, a biasing unit which is disposed in the positioning bore of the respective positioning seat and which biases the positioning rod so that a tip of the first end portion is displaced normally from a pivoting axis of a respective press arm by a distance equal to that between a plane lying on the inclined side surface of a respective retaining seat and the pivoting axis of the respective press arm, and a pull ring which is secured on the second end portion of the positioning rod. The first end portion of each of the positioning rods extends into the blind bore of the respective retaining seat when the respective press arm is in the locking position.

Note that the retaining seats and the positioning rods are exposed even when the press arms are in the locking position. Therefore, damage and deformation of the positioning rods and the retaining seats is likely to occur when a moving object strikes the press arms while the latter are in the locking position.

In addition, the manner in which the tip of the first end portion of each positioning rod contacts the inclined side surface of the respective retaining seat when the corresponding press arm is moved to the locking position sometimes results in unsmooth movement of the press arms.

SUMMARY OF THE INVENTION

The objective of the present invention is to provide an improved tube connecting device which can overcome the above mentioned drawbacks of the previously described patented device.

According to the present invention, a tube connecting device includes first and second tubular connector members, a pair of press arms, a pair of retaining seats, a pair of locating projections, a pair of retaining units and two pairs of guard plates. The first connector member has a receiving end portion formed with a pair of opposite radial openings and an extension end portion to be connected to a corresponding tube. The second connector member has an insert end portion which extends into the receiving end portion and an engaging end portion to be connected to a corresponding tube. The insert end portion has an outer surface which is formed with an annular peripheral groove that is registered with the radial openings. Each of the press arms has one end mounted pivotally to the first connector member adjacent to a respective one of the radial openings and formed with a cam face, and is pivotable to a locking position in which the cam face thereof extends into the peripheral groove via the respective radial opening so as to press against the second connector member at the annular groove in order to secure the second connector member to the first connector member. Each of the retaining seats projects outwardly and radially from the first connector member and is disposed below a respective one of the radial openings. Each of the retaining seats has a vertical through-hole formed therethrough. Each of the locating projections projects outwardly and radially from the first connector member and is disposed immediately below a respective one of the retaining seats. Each of the locating projections has a distal face which forms a first predetermined space with an axis of the through-hole. Each of the press arms has an inner side which is formed with a longitudinal positioning seat. The positioning seat is formed with an axial positioning bore which is aligned with the through-hole in a corresponding one of the retaining seats when the press arm is in the locking position and has an inner side face which forms a second predetermined space with an axis of the positioning bore. The second predetermined space is equal to the first predetermined space so that the inner side face of the positioning seat abuts the distal face of the locating projection below the corresponding one of the retaining seats. Each of the retaining units includes a positioning rod which is provided slidably in the positioning bore of a respective positioning seat and which has first and second end portions that extend out of the positioning bore, a biasing unit which is disposed in the positioning bore of the respective positioning seat and which biases the positioning rod so as to extend the first end portion normally out of the positioning bore, and a pull ring which is secured on the second end portion of the positioning rod. The first end portion of each of the positioning rods extends into the through-hole of the respective retaining seat when the respective press arm is in the locking position. The two pairs of the guard plates extend radially and outwardly from the first connector member such that the guard plates of each pair are located on two sides of a corresponding one of the retaining seats and on two sides of the locating projection immediately below the corresponding one of the retaining seats. The guard plates of each pair cover two sides of a corresponding press arm when the corresponding press arm is in the locking position.

BRIEF DESCRIPTION OF THE DRAWINGS

Other features and advantages of the present invention Will become apparent in the following detailed description of the preferred embodiment, with reference to the accompanying drawings, of which.

DETAILED DESCRIPTION OF THE PREFERRED EMBODIMENT

Figure 1:
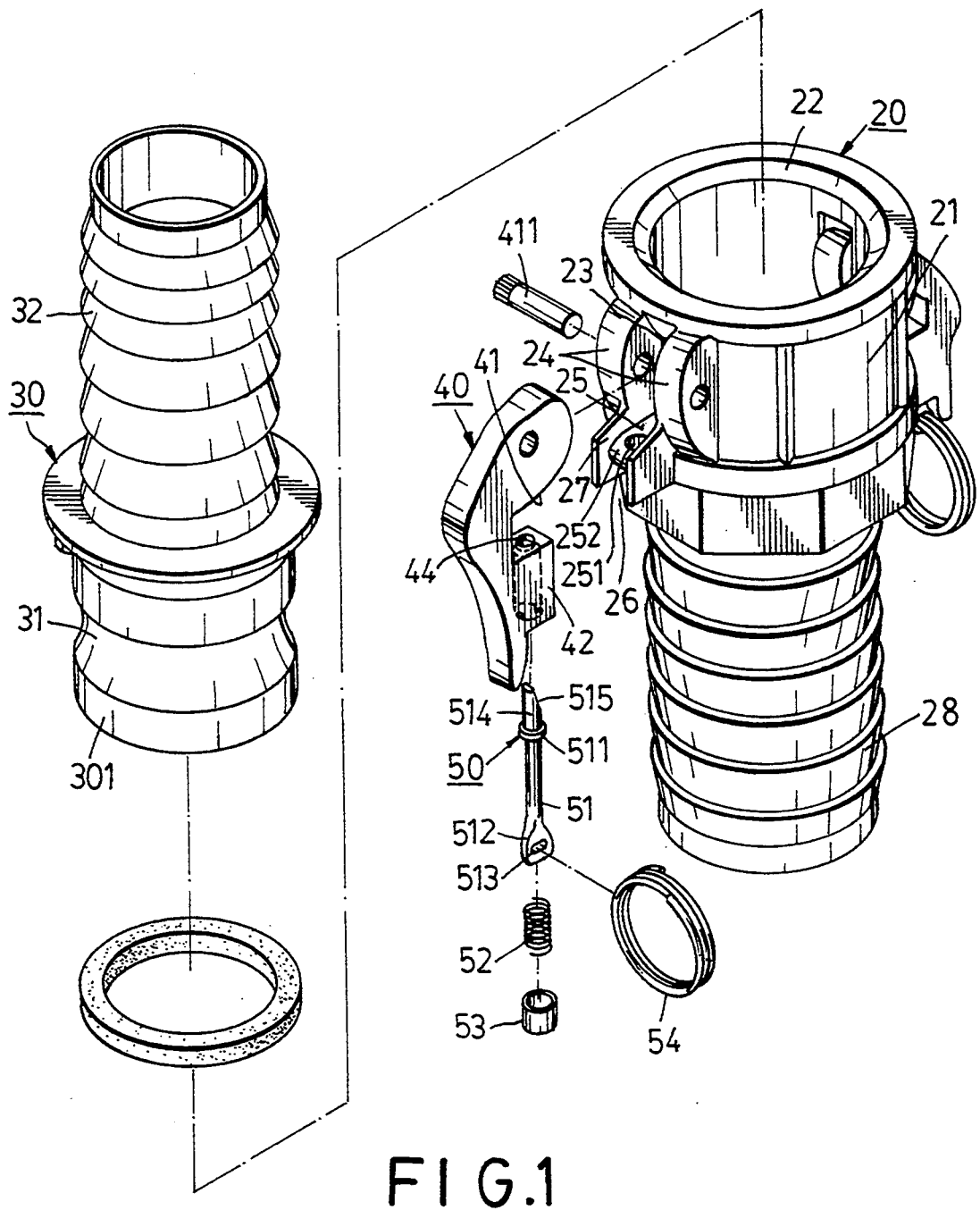
FIG. 1 is an exploded view of the preferred embodiment of a tube connecting device according to the present invention.
Figure 2:
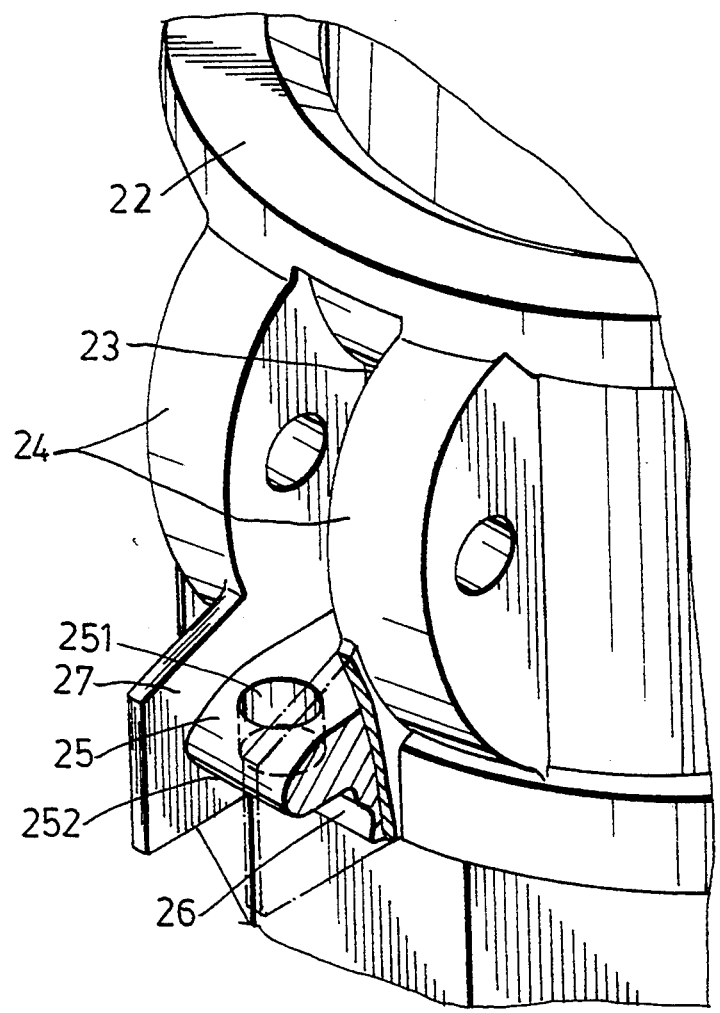
FIG. 2 is an enlarged view illustrating a portion of the tube connecting device according to the present invention.
Figure 3:
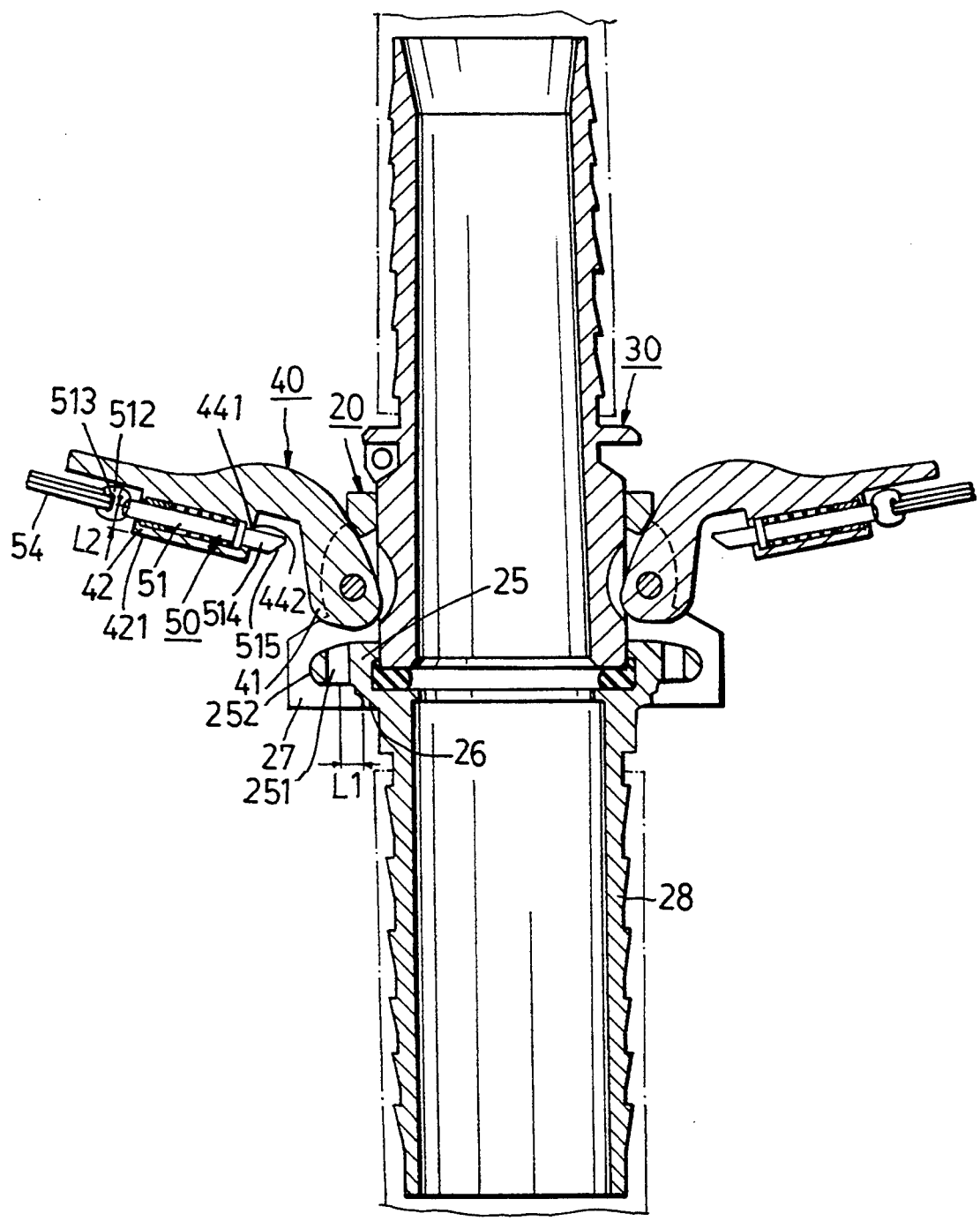
FIG. 3 is a sectional view of the preferred embodiment illustrating its assembly.

Referring to FIGS. 1, 2 and 3, the preferred embodiment of a tube connecting device according to the present invention is shown to comprise a first tubular connector member 20, a second tubular connector member 30, a pair of press arms 40 and a pair of retaining units 50.

The first connector member 20 has a receiving end portion 21 which has an appropriately-sized inner diameter and which confines a hollow receiving space 22 therein. Two opposite pairs of pivot ears 24 project outwardly from the receiving end portion 20. A radial opening 23 is formed between each pair of pivot ears 24. A retaining seat 25 projects outwardly from the receiving end portion 21 below each of the pairs of pivot ears 24. Each of the retaining seats 25 is formed with a vertical through-hole 251 and has a downwardly curving distal surface 252. A pair of locating projections 26 project outwardly and radially from the first connector member 20 and are disposed immediately below a respective one of the retaining seats 25. Each of the locating projections 26 has a distal face which forms a first predetermined space (L1) with an axis of the through-hole 251. Two pairs of guard plates 27 extend radially and outwardly from the first connector member 20 such that the guard plates 27 of each pair are located on two sides of the respective retaining seat 25 and on two sides of the locating projection 26 which is immediately below the respective retaining seat 25. The first connector member 20 further has an extension end portion 28 which is adapted to be connected to one end of a corresponding tube (shown in phantom lines). The structural connection between the extension end portion 28 and the corresponding tube is known in the art and will not be detailed herein.

The second connector member 30 has an insert end portion 301 which extends into the hollow receiving space 22 confined by the receiving end portion 21 of the first connector member 20. The insert end portion 301 has an outer surface which is formed with an annular peripheral groove 31. The peripheral groove 31 has an inwardly curved inner end and is registered with the radial openings 23. The second connector member 30 further has an engaging end portion 32 which is adapted to be connected to one end of a corresponding tube (shown in phantom lines). The structural connection between the engaging end portion 32 and the corresponding tube is known in the art and will not be detailed herein.

Each of the press arms 40 is provided between one of the pairs of pivot ears 24 and has one end which is formed with a cam face 41 and which is mounted pivotally to the pivot ears 24 via a pivot pin 411. Each of the press arms 40 further has an inner side which is formed with a longitudinal positioning seat 42. The positioning seat 42 is formed with an axial positioning bore 44 which is aligned with the throughhole 251 in a respective one of the retaining seats 25 when the press arm 40 is pivoted downwardly to a locking position. The positioning bore 44 has a first end which is adjacent to the cam face 41 of the press arm 40 and which is formed with an inward annular flange 441 that confines a through hole 442 which is coaxial with the positioning bore 44. The positioning seat 42 has an inner side face 421 which forms a second predetermined space (L2) with an axis of the positioning bore 44. The second predetermined space (L2) is equal to the first predetermined space (L1) so that the inner side face 421 of the positioning seat 42 abuts the distal face of the locating projection 26 below the corresponding retaining seat 25 when the press arm 40 is in the locking position.

Each of the retaining units 50 includes a positioning rod 51 which is provided slidably in the positioning bore 44 of a respective positioning seat 42. The positioning rod 51 has an intermediate portion which is formed with a radial flange 511 and first and second end portions 514,512 which extend out of the positioning bore 44. The diameter of the positioning rod 51 corresponds to the size of the through hole 442. A biasing unit, such as a compression spring 52, is disposed in the positioning bore 44 around the positioning rod 51. The compression spring 52 has one end which abuts against the radial flange 511. A locking ring 53 is provided around the positioning rod 51 and is press-fitted in a second end of the positioning rod 51, which second end is opposite to the first end thereof. The locking ring 53 abuts against the other end of the compression spring 52, thereby enabling the compression spring 52 to bias the positioning rod 51 to permit extension of the first end portion 514 of the positioning rod 51 normally out of the positioning bore 44. The first end portion 514 of each of the positioning rods 51 has a tip which is formed with an inclined surface 515 that abuts the distal surface 252 of the respective retaining seat 25 when the respective press arm 40 is being pivoted to the locking position. The second end portion 512 of each of the positioning rods 51 is formed with an elongated slot 513 which is transverse to an axis of the positioning rod 51. A pull ring 54, which is formed from a flexible wire material into a plurality of concentric turns, extends through the slot 513 in the second end portion 512 of a respective one of the positioning rods 51. Each of the pull rings 54 has one side adjacent to the inner side of the respective press arm 40.

Figure 4:
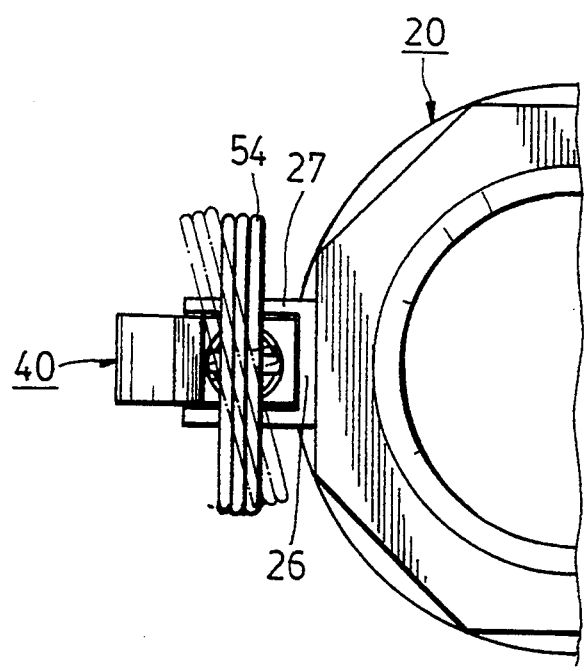
FIG. 4 is a fragmentary bottom view illustrating how a press arm of the preferred embodiment restricts the movement of a corresponding pull ring.
Figure 5:
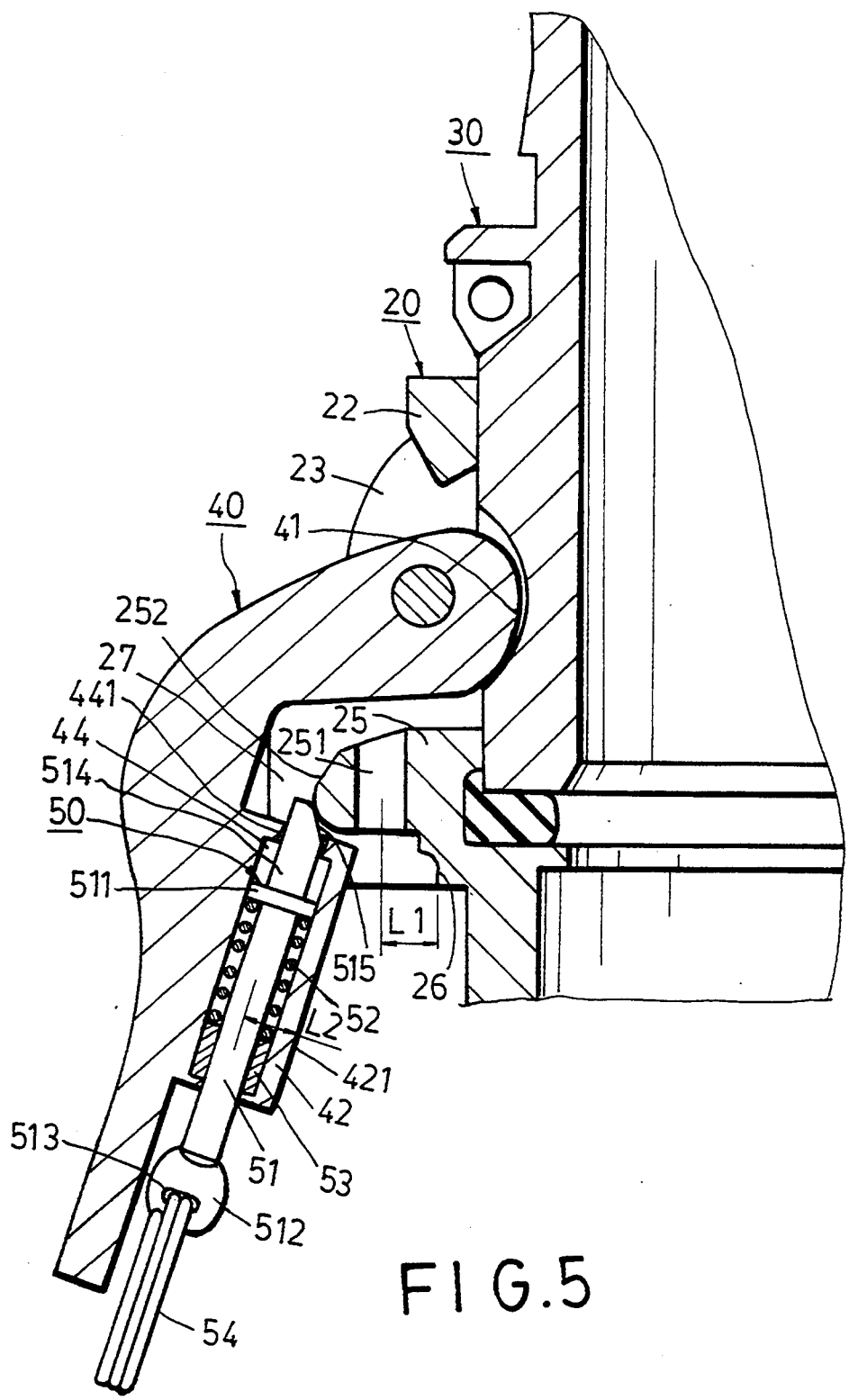
FIG. 5 is an enlarged fragmentary view which illustrates a positioning rod of the preferred embodiment when abutting a downwardly curving distal surface of a retaining seat.
Figure 6:
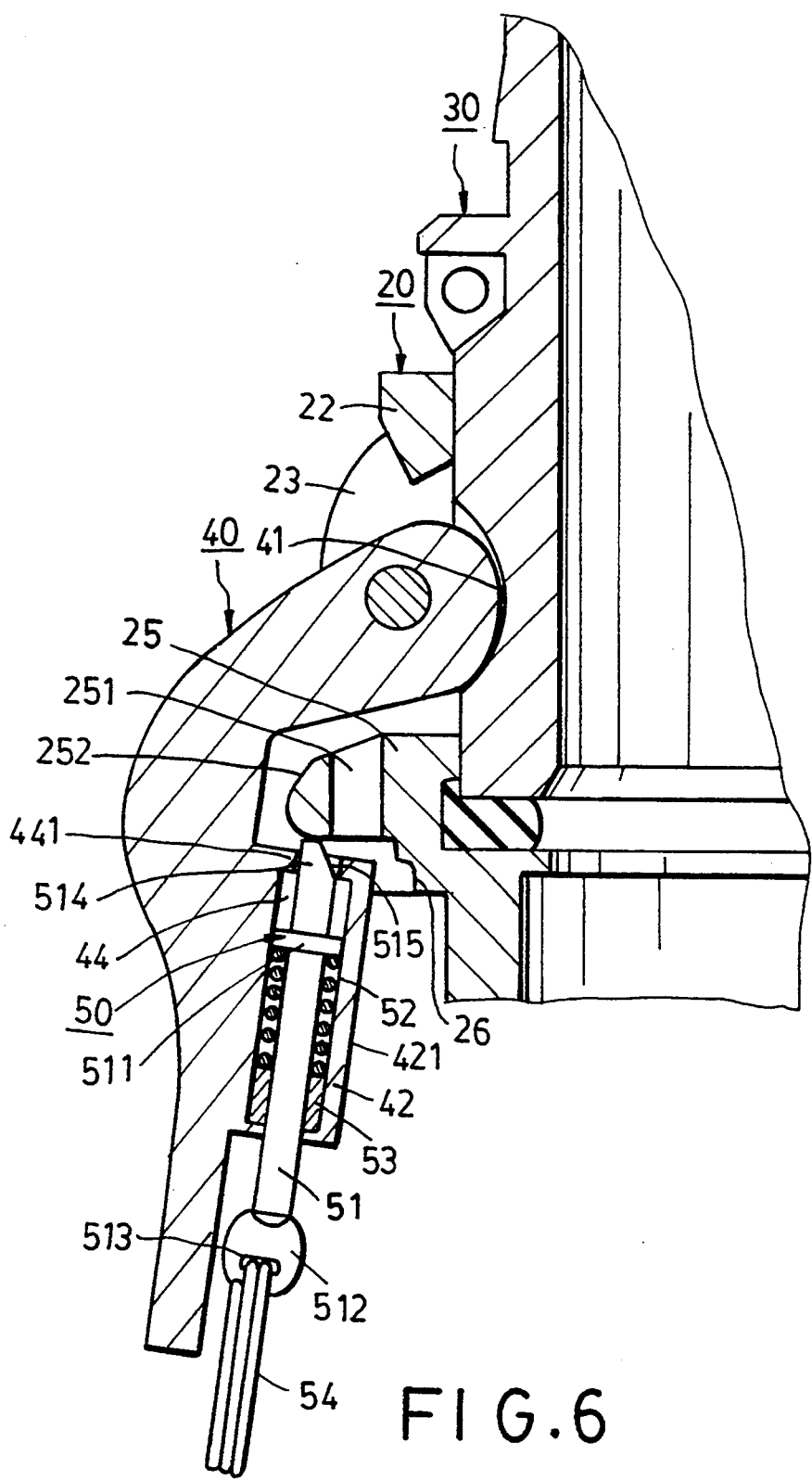
FIG. 6 is an enlarged fragmentary view which illustrates the positioning rod when retracted gradually into a positioning bore that is formed in the press arm due to downward pivoting movement of the latter.

Referring to FIGS. 4, 5 and 6, the positioning rods 51 are provided slidably in the positioning bore 44 of the respective positioning seat 25. The biasing unit 52 is disposed in the positioning bore 44 around the positioning rod 51. The locking ring 53 is provided around the positioning rod 51 and is press-fitted in the second end of the positioning bore 44 such that the positioning rod 51 is movable axially in the positioning bore 44. It should be noted that the second end portion 512 of each of the positioning rods 51 is flat. The pull rings 54 then extend respectively through the slots 513. Each of the pull rings 54 can be pulled in a direction along the axis of the positioning rod 51 so as to cause axial movement of the latter. Since the distance between the inner side of the press arm 40 and the respective pull ring 54 is relatively small, the rotation of the pull ring 54 about the axis of the positioning rod 51 is restricted so as to limit rotation of the positioning rod 51 in the positioning bore 44, thereby preventing the inclined surface 515 of the positioning rod 51 from being misplaced relative to the distal surface 252 of the respective retaining seat 25 when the respective press arm 40 is being pivoted to the locking position.

Figure 7:
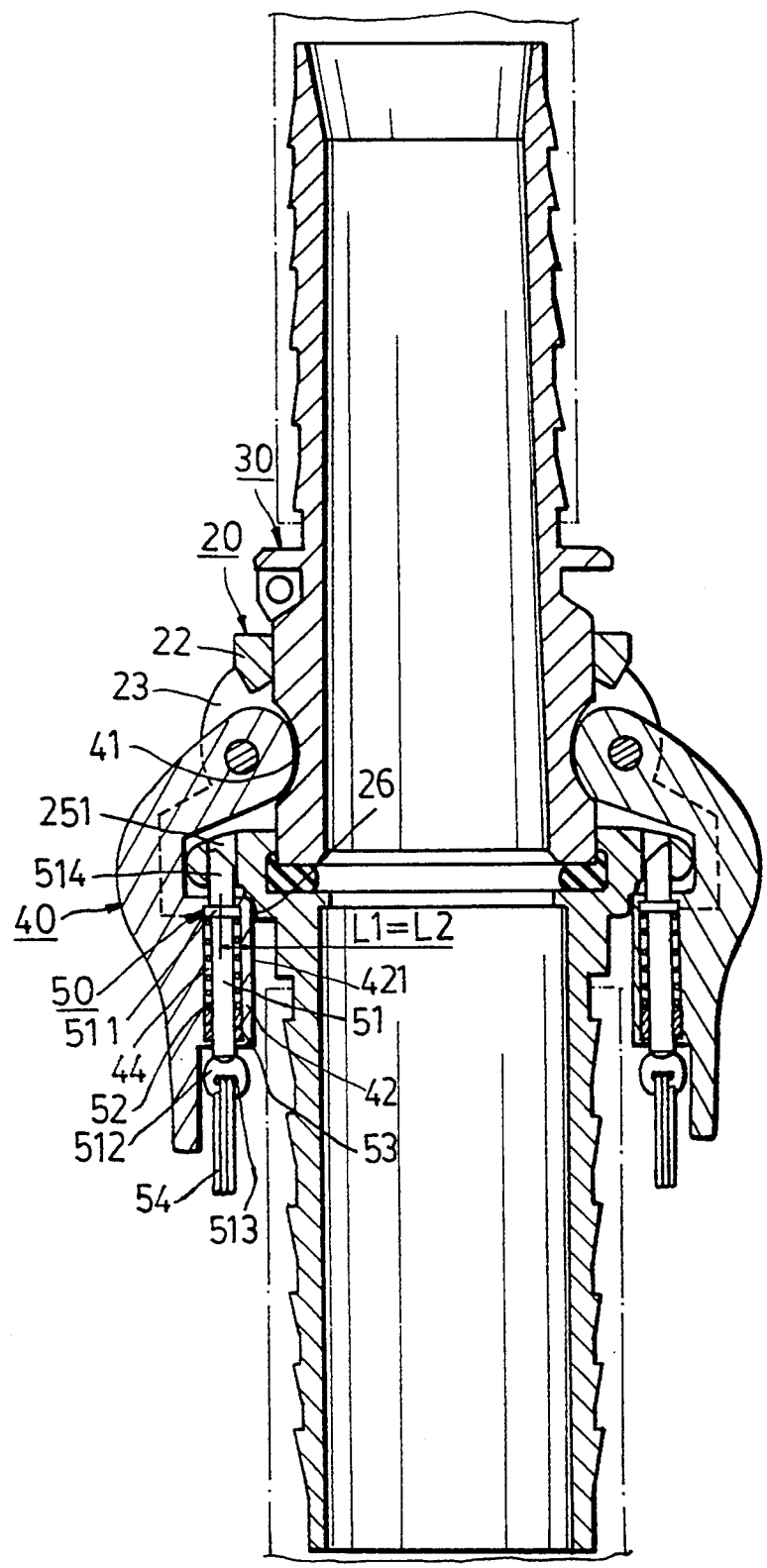
FIG. 7 is a sectional view of the preferred embodiment illustrating the positioning rods when engaging the retaining seats.

Referring to FIGS. 3, 5 and 6, when the insert end portion 301 of the second connector member 30 is inserted within the hollow receiving space 22 in the receiving end portion 21 of the first connector member 20, the peripheral groove 31 is registered with the radial openings 23. The press arms 40 are then pivoted to the locking position toward the extension end portion 28, thereby causing the cam faces 42 of the press arms 40 to extend into the peripheral groove 31 via the respective radial opening 23, as best illustrated in FIG. 7. The cam faces 42 press against the second connector member 30 at the peripheral groove 31, thereby securing the second connector member 30 to the first connector member 20.

As the press arms 40 are pivoted to the locking position, the inclined surface 515 of the first end portion 514 of each positioning rod 51 eventually abuts against the distal surface 252 of the respective retaining seat 25. As the first end portion 514 moves downwardly along the distal surface 252 due to further pivoting movement of the corresponding press arm 40, the positioning rod 51 is retracted gradually into the positioning bore 44 against the action of the compression spring 52, as best illustrated in FIG. 5.

Figure 8:
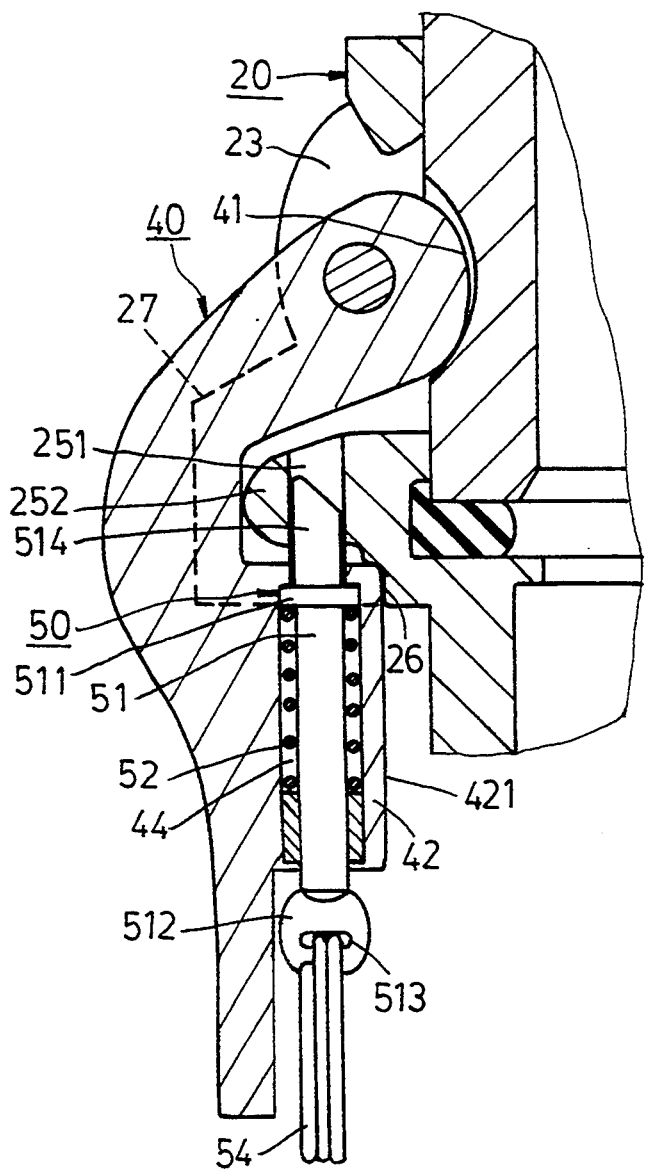
FIG. 8 is an enlarged fragmentary view which illustrates one of the positioning rods when engaging the respective retaining seat.

Referring to FIGS. 7 and 8, when the positioning bore 44 is aligned with the through-hole 251 in the respective retaining seat 25, the distal surface 252 ceases to exert pressure on the first end portion 514 of the positioning rod 51. The compression spring 52 expands to cause the radial flange 511 to abut against the annular flange 441. The first end portion 514 of the positioning rod 51 extends into the through-hole 251 at this stage, thus retaining the press arms 40 on the first connector member 20 so as to prevent untimely movement of the former. Tight engagement between the first and second connector members 20, 30 is therefore ensured.

It should be noted that since the first predetermined space (L1) is equal to the second predetermined space (L2), the inner side face 421 of each of the positioning seats 42 abuts against the distal face of the respective locating projection 26 when the respective press arm 40 is in the locking position. Therefore, damage and deformation of the positioning rods 51 and the retaining seats 25 can be prevented when a moving object strikes the press arms 40 while the latter are in the locking position.

The guard plates 27, which are located on two sides of the retaining seats 25 and on two sides of the locating projections 26, and which cover two sides of the press arms 40 when the press arms 40 are in the locking position, provide additional protection against damage and deformation of the positioning rods 51 and the retaining seats 25 when the press arms 40 are subjected to impact. Moreover, the manner in which the inclined surfaces 515 of the positioning rods 51 are in contact with the distal surface 252 of the respective retaining seat 25 ensures smooth movement of the press arms 40 to the locking position.

Referring to FIG. 8, when it is desired to disengage the second connector member 30 from the first connector member 20, the pull rings 54 are pulled downwardly so as to retract the positioning rods 51 into the respective positioning bore 44 against the action of the compression springs 52, thereby disengaging the first end portion 514 from the respective retaining seat 25. The press arms 40 are then pivoted upwardly to an unlocking position until the cam faces 42 of the press arms 40 cease to extend into the peripheral groove 31 in the second connector member 30. The second connector member 30 can be removed from the first connector member 20 at this stage.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:
1. A tube connecting device including
a first tubular connector member having a receiving end portion formed with a pair of opposite radial openings and an extension end portion to be connected to a corresponding tube;
a second tubular connector member having an insert end portion which extends into said receiving end portion and an engaging end portion to be connected to a corresponding tube, said insert end portion having an outer surface which is formed with an annular peripheral groove that is registered with said radial openings;
a pair of press arms, each having one end mounted pivotally first connector member adjacent to a respective one of said radial openings and formed with a cam face, each of said press arms being pivotable to a locking position in which said cam face thereof extends into said peripheral groove via the respective said radial opening so as to press against said second connector member at said annular groove in order to secure said second connector member to said first connector member;
wherein the improvements comprise:
a pair of retaining seats, each of which projecting outwardly and radially from said first connector member and being disposed below a respective one of said radial openings, each of said retaining seats having a vertical through-hole formed therethrough;

a pair of locating projections, each of which projecting outwardly and radially from said first connector member and being disposed immediately below a respective one of said retaining seats, each of said locating projections having a distal face disposed a first predetermined distance from an axis of said through-hole;

each of said press arms having an inner side which is formed with a longitudinal positioning seat, said positioning seat being formed with an axial positioning bore which is aligned with said through-hole in a corresponding one of said retaining seats when said press arm is in said locking position and having an inner side face disposed a second predetermined distance from an axis of said positioning bore, said second predetermined distance being equal to said first predetermined distance so that said inner side face of said positioning seat abuts said distal face of said locating projection below said corresponding one of said retaining seats;

a pair of retaining units, each of said retaining units including a positioning rod which is provided slidably in said positioning bore of a respective said positioning seat and which has first and second end portions that extend out of said positioning bore, a biasing unit being disposed in said positioning bore of said respective positioning seat and biasing said positioning rod so as to extend said first end portion normally out of said positioning bore, and a pull ring secured on said second end portion of said positioning rod, said first end portion extending into said through-hole of said respective retaining seat when said respective press arm is in said locking position; and two pairs of guard plates, each pair of which extending radially and outwardly from said first connector member and being located on two sides of a corresponding one of said retaining seats and on two sides of said locating projection immediately below said corresponding one of said retaining seats, each pair of said guard plates covering two sides of a corresponding said press arm when said corresponding said press arm is in said locking position.

2. A tube connecting device as claimed in claim 1, wherein each of said retaining seats has a downwardly curving distal surface, and said first end portion of each of said positioning rods has a tip which is formed with an inclined surface that abuts said distal surface of said respective retaining seat when said respective press arm is being pivoted to said locking position.

3. A tube connecting device as claimed in claim 2, wherein said second end portion of each of said positioning rods is formed with an elongated slot which is transverse to an axis of said positioning rod, each of said pull rings extending through said slot in said second end portion of a corresponding one of said positioning rods and having one side adjacent to said inner side of a corresponding one of said press arms.

* * * * *